United States Patent [19]

Stepan

[11] Patent Number: 5,010,797
[45] Date of Patent: Apr. 30, 1991

[54] ARRANGEMENT FOR CUTTING AND/OR STRIPPING APPARATUSES

[76] Inventor: Jiri Stepan, St. Gallerstrasse 76, CH-7320 Sargans, Switzerland

[21] Appl. No.: 210,578

[22] Filed: Jun. 23, 1988

[30] Foreign Application Priority Data

Jun. 30, 1987 [CH] Switzerland ............ 2494/87

[51] Int. Cl.$^5$ ............................................. H02G 1/12
[52] U.S. Cl. ................................. 83/883; 83/885; 81/9.51
[58] Field of Search .................. 81/9.51, 9.42, 9.44; 83/883, 884, 885

[56] References Cited

U.S. PATENT DOCUMENTS

| | | | |
|---|---|---|---|
| 1,075,031 | 10/1913 | Ginaga | 83/883 |
| 2,401,149 | 5/1946 | Gordon | 81/9.51 |
| 2,703,026 | 3/1955 | Basile et al. | 81/9.51 |
| 3,892,145 | 7/1975 | Richie | 81/9.51 |
| 4,327,609 | 5/1982 | Resch | 81/9.51 |
| 4,745,828 | 5/1988 | Stepan | 81/9.51 |

FOREIGN PATENT DOCUMENTS

| | | |
|---|---|---|
| 146397 | 12/1984 | European Pat. Off. . |
| 195932 | 2/1986 | European Pat. Off. . |
| 152887 | 6/1904 | Fed. Rep. of Germany ....... 81/9.51 |
| 2122675 | 5/1971 | Fed. Rep. of Germany . |
| 2848445C2 | 10/1985 | Fed. Rep. of Germany . |
| 3515223 | 10/1986 | Fed. Rep. of Germany ....... 81/9.51 |
| 2282179 | 3/1976 | France . |
| 651426A5 | 9/1985 | Switzerland . |
| 2063580 | 6/1981 | United Kingdom . |

*Primary Examiner*—Douglas D. Watts
*Assistant Examiner*—John M. Hosar
*Attorney, Agent, or Firm*—Ostrolenk, Faber, Gerb & Soffen

[57] ABSTRACT

The invention relates to an arrangement of a plurality of holding, centering or knife jaws (7, 18) for cutting and/or stripping apparatuses for rod-like or cable-like articles (22). The jaws (7, 18) are each displaceable or pivotable in a certain direction. The end points of a line (5) which, when the jaw (7, 18) is viewed, is turned to face the article (22) define a straight line (2). The angle between the particular direction of each jaw (7, 18) and this straight line (2) is less than 90 degrees. This results in constantly changing contact points for changing diameters of the articles (22), and distributed wear of the jaws (7, 18).

15 Claims, 9 Drawing Sheets

ARRANGEMENT FOR CUTTING AND/OR STRIPPING APPARATUSES

BACKGROUND OF THE INVENTION

1. Field of the Invention

The invention relates to an arrangement of at least three holding, centering or knife jaws, lying in a plane, in cutting and/or stripping apparatuses for rod-like or cable-like articles.

It also relates to an arrangement of at least three holding, centering or knife jaws, lying in a plane, in cutting and/or stripping apparatuses for rod-like or cable-like articles, which jaws are each displaceable or pivotable in the direction of a first straight line, and adjacent first straight lines make a first angle with one another. The position of the first straight line is defined by the direction of displacement or by the position of a tangent on the outermost swivel radius of each jaw. In the latter case, the outermost swivel radius is determined by the distance from a center of rotation to that point of each jaw which is farthest away from the said center of rotation.

For the purposes of the present invention, the term line also means a curved line. Such an arrangement is used, for example, for stripping wires.

2. Background Art

Corresponding arrangements are available in a very wide variety of embodiments: German Offenlegungsschrift 2122675 shows four knife jaws, two of which lie in a plane while the other two knife jaws lie in a parallel plane, in each case opposite one another. Hence, a rectangular area is formed between these four knife jaws, the said area being surrounded by blades. This rectangle is enlarged when the opposite knife jaws are pushed apart. By pushing the knives together, the rectangle is made smaller. Furthermore, a control is provided which synchronizes the movement of all four knives so that the rectangle always has sides of equal length. Such knife arrangements have a large variable diameter range and are of a simple design.

A similar arrangement is disclosed in Swiss Patent 651426 (British Patent 2063580). The embodiment is in principle very similar to the embodiment described in the German Offenlegungsschrift, but the cutting line or the contact line of the knife jaws is curved.

The entire content of these publications as well as the content of the publications cited below is to be regarded as part of the disclosure of the present invention.

The French Patent 2282179 describes a knife arrangement having radially guided knives whose cutting line is at an angle of about 45° to the direction of displacement.

As a result of the substantial automation of production lines, there is a constant requirement for increased stability of the knife jaws. It is necessary to take into account in particular the fact that the stripping processes often involve different diameters. The stability of the known knife jaws described above is limited because, even when the cables to be stripped are of different diameters, it is always one and the same part of the knives which bears the load or at least part of the load. For example, it is clear from FIG. 12 of the German Offenlegungsschrift and from FIG. 2 of the Swiss Patent that, even when the knives are pushed together or pulled apart, it is always the middle region of the knives which performs the cutting function. Hence, the middle region is subject to great wear while the edge regions may suffer scarcely any wear. In the case of the French Patent, the same applies to the frontmost tip of the jaws. In the case of holding or centering arrangements, "grinding" of the holding or centering surfaces occurred in a similar manner and after some time had an adverse effect on the precision. This also applies to the arrangement according to U.S. Pat. No. 1,597,460, which arrangement, however, only has two knife jaws and therefore does not permit centering of the cables.

Knife arrangements have also been disclosed, for example in U.S. Pat. No. 3,892,145, which have rotatable knives whose service lives are also longer than those of previously known static knives. A disadvantage, however, is that these knives have only a slightly variable diameter range and furthermore cannot be closed to extremely small diameters, as is the case with conventional arrangements. Furthermore, such knife arrangements require additional sliding bearings and may require expensive rotary drives and have therefore not become established in practice.

German Patent 28 48 445 (U.S. Pat. No. 4,327,609) and, for example, also European Offenlegungsschrift 146 397 disclose arrangements which employ different points but, like some of the constructions mentioned above, lie back to back or in two planes. Consequently, when cutting into a cable, the latter is perforated along its circumference, viewed in the axial direction, along different lines, which can lead to uneven tearing during subsequent stripping; this is particularly the case when the knife blades are provided with a chamfer, as is essential for increasing the stability.

SUMMARY OF THE INVENTION

The object of the invention is to increase several-fold the stability of the jaw arrangement and of the knife blades and that of the surface used.

This object is achieved to a surprisingly great extent by an arrangement wherein the jaws are displaceable or pivotable under positive control in such a way that a certain line of each holding or centering surface or a certain point of each knife blade is assigned to each diameter of an article or can be brought into tangential contact with the article. More particularly, the end points of a line which, when the jaw is viewed, define that surface of the said jaw which can be turned to face the article, define a second straight line, and each second straight line forms a second angle of less than 90 degrees with its associated first straight line, and wherein the line can be brought into tangential contact with the article. Depending on the frequency of diameter changes (different cable diameters) in a jaw arrangement during a working cycle, it is possible, with an arrangement according to the invention, to increase the life of the knives and prolong the unchanged holding properties of the holding or centering jaws by up to two powers of ten compared with the conventional arrangements mentioned. This in turn means less maintenance and hence less susceptibility to faults in combination with very precise cutting and holding or centering by the holding, centering and knife jaws. The greater the number of jaws provided in an arrangement, the greater is the second angle. 90 degrees therefore cannot be reached since in this case the area of engagement can no longer be changed. Zero degrees means that only two jaws are provided, whose second straight line is parallel to the first straight line. In this extreme position, only part of the effect according to the invention would still be achieved but at the same time the centering effect would be lost.

The arrangement of the jaws in a plane ensures, in an outstanding manner, that, for example during stripping of a cable, the latter is cut exactly along a single circumferential line, so that, when the tubular sleeve is stripped off from the cable, it is impossible for different stripping moments—and hence defective tearing—to occur. The blade can be provided with a chamfer on both sides, and fragmentation of the blade is thus prevented (for example in the case of hard metals).

In this disclosure, further advantageous embodiments and possible variations of the invention are described.

In one arrangement, the first angle is determined by the formula 360:n, where n denotes the number of jaws while the second angle is determined by the formula 90 minus one-half the first angle. In another arrangement, the second angle is 30 to 60 degrees, preferable 45 degrees. These arrangements are distinguished by geometric exactness and simple production, all jaws having the same construction.

An arrangement wherein each jaw has a recess for an adjacent jaw permits an extremely wide range from small to large diameters. The change in the cutting or holding diameter when the jaws are adjusted with respect to one another takes place linearly in the case of a linear embodiment and as a function of the curve function in the case of the embodiment having a curved cutting line or holding surface. The arrangement is controlled synchronously for all jaws.

Although U.S. Pat. No. 4,528,741 also describes a possible method for placing the cutting surfaces in a plane (FIG. 7), this is possible only for an arrangement of two knives in accordance with the arrangement shown there. Since in a four-fold arrangement, however, at least the adjacent knives must overlap, there is once again inevitably a slight difference between one side and the other in the embodiment according to the U.S. Patent, even if the distance between the knives is perhaps only a few hundredths of a millimeter. In the case of small cable diameters or firmly adhering or hard or tough insulations, this may be very troublesome and may lead to spoilage.

Advantageous guide mechanisms are disclosed which are of simple and compact design and ensure a play-free and long life of the arrangement, for example, wherein the jaws are controlled by a rotating control means having two-armed levers, via wedge surfaces, the control according to claim 6 corresponding to that according to EP-A 195932, which is herewith completely incorporated by reference. In another advantageous guide mechanism, each jaw is guided in a track and has at least one guide pin which interacts with a control means which may have a disk possessing a spiral control groove or the like for the guide pin.

Life-increasing measures which simultaneously permit rapid tool change and nevertheless permit very precise guidance are measures where the jaws consist of two parts and have a body which carries replaceable holding, centering or cutting plates—preferably of hard metal or sintered material—the jaws carrying retaining pins which interact with diametrically opposed plate holders.

By choosing the position of the knife jaws wherein each knife jaw has at least one ground phase, those phases of each knife jaw which point in the same direction being similar, and one out of two phases of each knife jaw preferably being in the form of a support phase, the positive effect of the invention in providing an exact tear line and clear cutting control along a single circumferential line is reinforced. Consequently, it is possible to cut into soft plastics as well as to cut through, for example, hard wire nettings (shielding) or wires (conductors). The durability of knife blades is increased.

The curvature of the contact line wherein the contact line of the knife jaws curves inward or outward, the radius of curvature (RK) preferably being determined by the formula $RK=2.2\times RS$, in which RS represents the outermost swivel radius or the distance of the outermost point of the jaw from its pivot axle permits a larger outer diameter of the articles to be handled in the case of a concave shape and the simple use of pivotable jaws in the case of a convex shape, so that the said jaws close tightly against one another without overlapping one another.

A self-inhibiting action with spring force prevents independent uncontrolled shiftings of positions which have been selected. This gives a centering or holding arrangement whose tension permits small tolerances at the surface of the articles, the engagement pressure on the surface of the articles always being constant. In most embodiments, oblique abutting surfaces with suitable frictional contact provide the self-inhibiting effect.

An apparatus according to EP-A-195932, which likewise discloses a self-inhibiting effect, serves as an example of a possible application of the invention.

At least two groups of jaws may be provided, each of which lie in a plane and are parallel to the others and may be arranged so that they are displaceable in the axial direction of the articles. This permits multi-stage stripping in a single operation. This arrangement can also be used in fully automatic operation.

Although the invention is described in particular with reference to stripping apparatuses, it may also be used for many other holding or cutting tasks. Such applications are thus also embraced by the invention.

BRIEF DESCRIPTION OF THE DRAWINGS

The invention is illustrated in more detail with reference to the sketches, by way of example.

DETAILED DESCRIPTION OF PREFERRED EMBODIMENTS

The Figures are described in relation to one another. Identical reference symbols denote the same or similar parts. In the case of identical reference symbols, different indices indicate different embodiments or identical components in an assembly.

Figure 1:
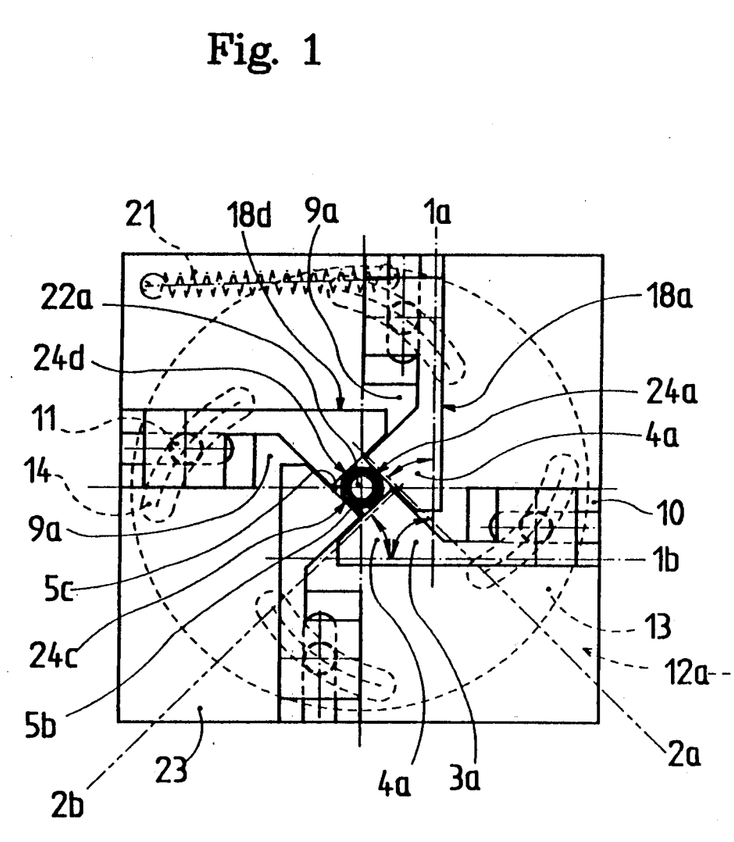
FIG. 1 shows a plan view of an arrangement having four holding jaws and a control means in the open state.
Figure 2:
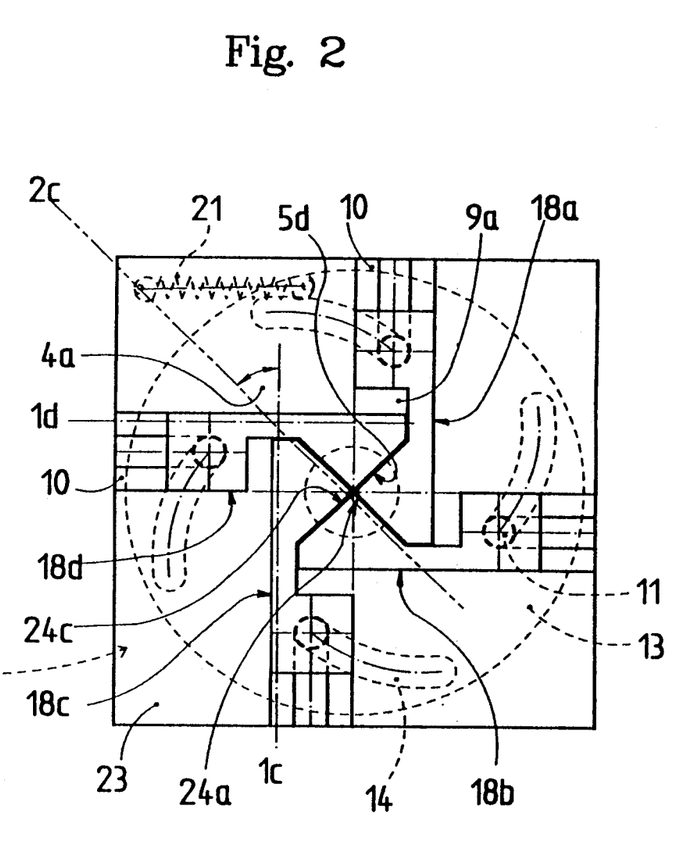
FIG. 2 shows the same arrangement in the closed state.

The embodiment according to FIG. 1 and 2 shows an open and closed arrangement of four holding jaws 18a–d, each of which can be displaced longitudinally along dash-dot straight lines 1a–d. The holding jaws 18a–d each have recesses 9a, so that they can engage one another. They each have a contact line 5a–d, on which a rod-shaped article 22 can be held when the holding jaws are in the open state. In FIG. 2, the holding jaws 18a–d are completely closed, i.e. they are lowered into associated recesses 9a, and the area circumscribed by the contact lines 5a–d is zero.

The contact line of the holding jaws 18a–d is a straight line and extends along a second straight line 2a–d shown as a dash-dot line in the drawing. Each second line 2a–d forms an angle 4a of 45 degrees with the associated first straight lines 1a–d. Adjacent first straight lines 1a–d form an angle 3a of 90 degrees with one another, and the first straight lines 1a–d of non-adjacent holding jaws form an angle of 180 degrees with one another.

Opening of the holding jaws 18a–d is shown stepwise in the sequence in FIG. 1–2. It occurs as a result of synchronous pulling apart of the holding jaws 18a–d, with the result that an area which can be increased continuously occurs between the contact lines 5a–d. Within this area, it is thus possible to hold an article 22a which, for example, may be elongated and may pass through the plane of the drawing.

To permit them to be pulled apart, the holding jaws slide in tracks 10 of a guide plate 23. Guide pins 11 indicated by a dashed line are rigidly connected to the holding jaws 18a–d. These guide pins 11 engage spiral control grooves 14 (likewise indicated by a dashed line), which are formed in a disk 13. The disk 13 having the control grooves 14 thus forms a control means 12a which pulls the holding jaws 18a–d apart when rotated about its own axis in one direction but pushes the holding jaws together when rotated in the other direction. As a result, the guide pins 11 slide on the inclined sliding surface of the control grooves 14 with a certain friction, so that a self-inhibiting effect against unintentional displacement occurs at a certain angle of inclination.

The disk 13 is rotatably mounted on the guide plate 23 in a manner not shown and is connected to the said plate via a tension spring 21. The tension spring 21 exerts a force on the control means 12a in that rotary direction of the disk 13 which causes the holding jaws 18a–d to close.

Thus, if the disk 13 is rotated randomly in the opening direction of the jaws 18a–d, as shown, for example, in FIG. 1, and an article 22a is then clamped between the contact lines 5a–d and the disk 13 is released again, the holding jaws 18a–d close under the pressure of the spring 21. Assuming uniformity of the spring force, a uniform contact pressure is thus exerted at the surface of the article 22, regardless of its diameter. A strong contact pressure which could damage the article 22 is thus avoided.

If the article 22a (as in many cases) has a circular periphery, the contact line 5a–d rests on the surface of the article 22 only in a very small, linear region 24a–d. As can be seen from the two FIGS. 1 and 2, this region 24a–d is always at a different point of the contact line 5a–d of the holding jaws 18. In FIG. 2, the region 24a–d is located theoretically entirely at the beginning of each contact line 5a–d. Because this region 24a–d moves outward, wear at the surface of the holding jaws 18a–d is also distributed over a wide region, so that it is scarcely possible for pronounced wear to occur at a single point—assuming an average change in the holding diameter.

Figure 10:
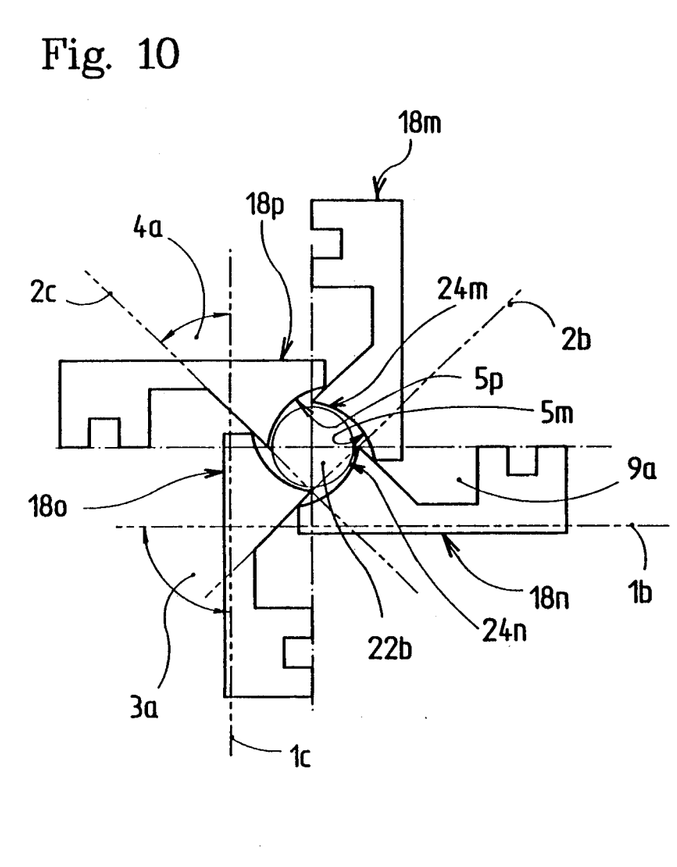
FIG. 10 shows another variant having a curved contact line, in the half-open state.

FIG. 10 shows a similar arrangement but with a curved contact line 5m–p and with holding jaws 18m–p. The starting and end points of each contact line 5m–p can be connected by means of a straight line, which in turn lies along the second straight line 2a–d described above.

As a result of the curvature of the contact line, the displacement of a region 24m–p for contact with an article 22b is not optimal, but it is possible, with otherwise identical dimensions of the holding jaws 18m–p, to hold larger diameters of the articles 22b (cf. FIG. 1, 18a–d and 22a).

Figure 6:
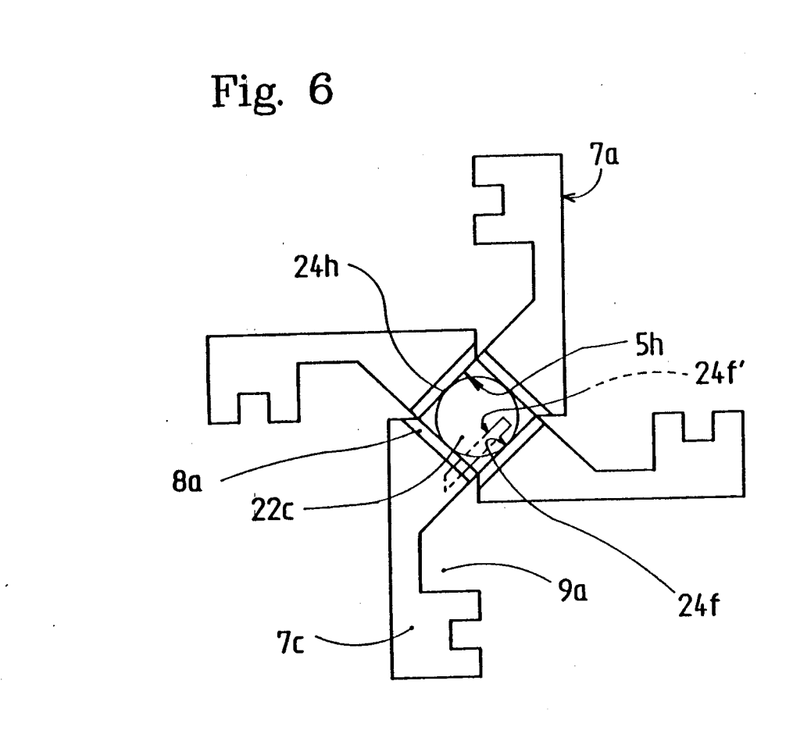
FIG. 6 shows an arrangement of cutting jaws in the entirely open state.
Figure 7:
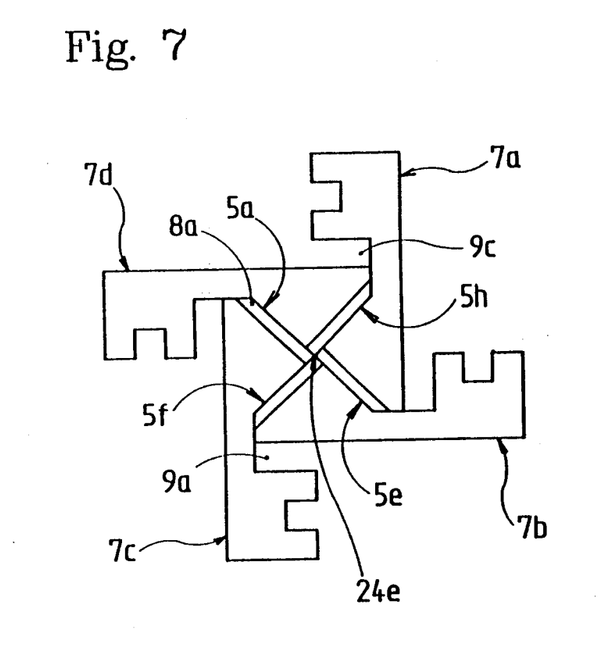
FIG. 7 shows the same arrangement closed.

FIG. 6 and 7 show schematic knife jaws 7a–d which in principle are similar to the holding jaws 18a–d described above. It is of course also possible for the knife jaws 7a–d to have a curved contact line or cutting line. The contact lines or cutting lines are denoted by 5e–h. In the case of the contact lines 5e–h of the knife jaws 7a–d, a displacement of the region 24e–h of contact with an article 22c during cutting is readily recognizable. If the blades of the knife jaws 7a–d penetrate into the surface of the article 22c, the region 24f-24f is automatically displaced toward the edge (dashed line in FIG. 6). In this case too, wear of the knife blade or contact line 5e–h is distributed uniformly over a certain length. By means of such knife jaws 7a–d, it is therefore possible to strip or cut, for example, very thin wires in an advantageous manner.

In order to meet very high requirements, it is also envisaged that knife jaws 7i (FIG. 15, 16) will be equipped with hard metal cutting plates 16f. The knife jaws 7i are in this case provided with a body 15b which has two retaining pins 19 which engage recesses 20 in the cutting plates 16f. The cutting plates 16f are screwed to the body 15b by means of a screw 25. The retaining pins 19 ensure play-free positioning of the cutting plates 16f. The cutting plates 16f are in the form of indexable inserts and therefore have two contact lines 5i and 5k, the contact line 5i or the knife blade of this side first coming into use. If the cutting plate 16f is worn along its contact line 5, it can very simply and rapidly be raised by loosening the screw 25, reversed and fastened again. As a result, the contact line 5k is then used for cutting.

Figure 15:
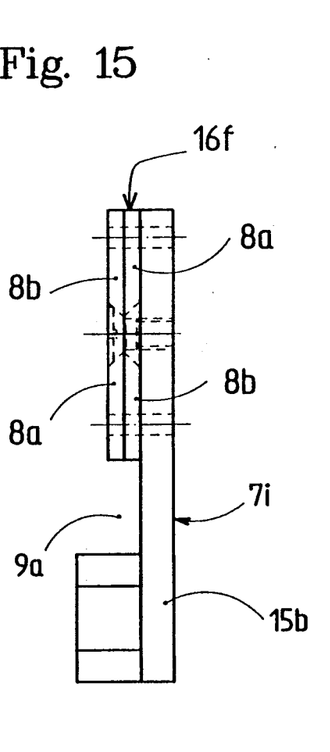
FIG. 15 and 16 show a knife jaw having replaceable cutting plates, as a side view and elevation, respectively.
Figure 16:
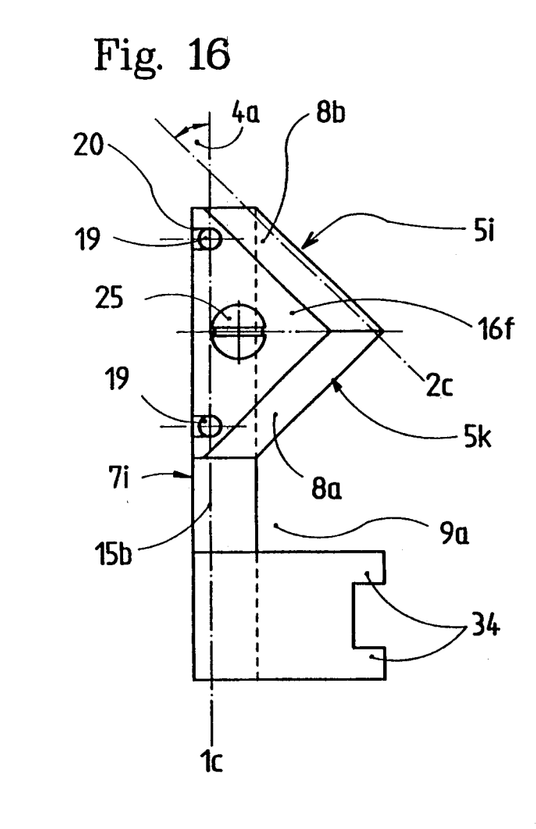

For this purpose, it is necessary for the retaining pins 19 to be arranged as a mirror image about screw 25.

Figure 3:
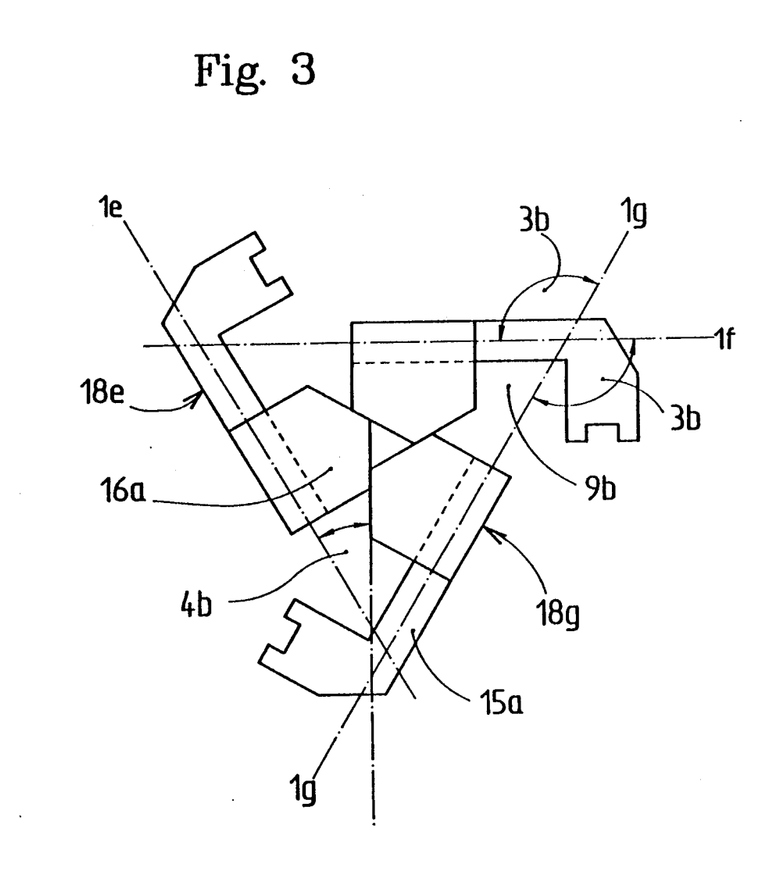
FIG. 3 shows an arrangement having three holding jaws in the open state.
Figure 4:
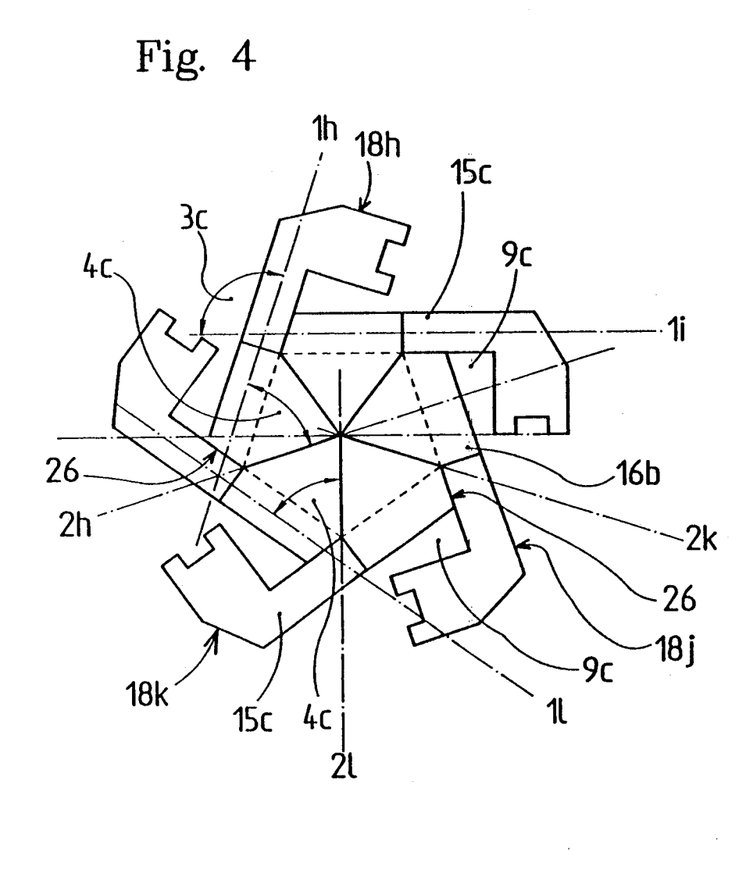
FIG. 4 shows another arrangement having five holding jaws in the closed state.
Figure 5:
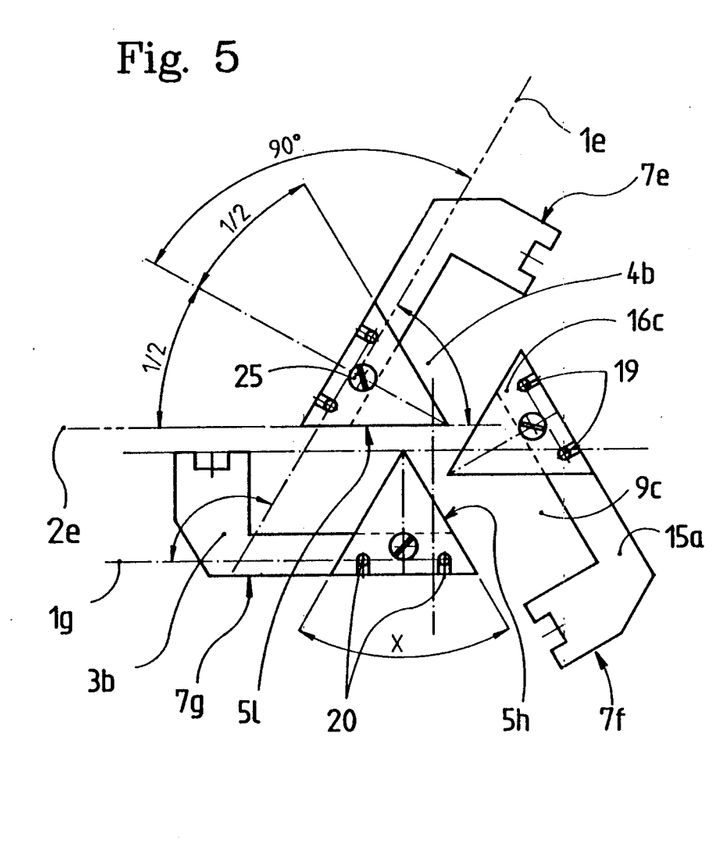
FIG. 5 shows another arrangement having three holding jaws which do not make positive contact with one another.

FIG. 3 to 5 likewise show two divided jaws (holding jaws 18e-g (FIG. 3) and 18h-l (FIG. 4), and cutting jaws 7e-g (FIG. 5)), each of which are also divided into two parts and have a body 15a (FIG. 3 and 5) and 15c (FIG. 4). The difference between the bodies 15a and 15c is that body 15c has a flat area 26 (FIG. 4). The flat area 26 allows the five jaws 18h-l of the embodiment according to FIG. 4 to come into contact with one another without overlapping one another.

All variants are in any case based on the same principle, which therefore need not be discussed in detail. It is merely necessary to mention that the replaceable holding jaws in FIG. 3 are denoted by 16a and those in FIG. 4 by 16b.

FIG. 5 shows replaceable cutting plates 16c which—as described further above—are fastened to the bodies 15a. In all variants shown, with the exception of FIG. 5, the holding jaws 18 or cutting jaws 7 always come into contact with one another. The example of FIG. 5, however, shows that this closed contact is not absolutely essential for the purposes of the invention in order to obtain acceptable cutting or holding properties. However, one of the advantages of this arrangement is that a relatively small number of components are provided, and the said components may therefore be of uncomplicated design. Moreover, the geometric dimensions of the indexable inserts 16c are such that they can also be intended for an arrangement having six cutting jaws 7.

An arrangement of this type is not shown but can easily be imagined by rotating the cutting jaws 7e-g shown through 60 degrees to the right and placing them over the drawing shown. As a result, the spaces between the cutting jaws 7e-g are filled with similar cutting jaws.

The innermost point is the cutting line 51-n, as shown for cutting jaw 7e, advantageously supported both to the left and to the right by the same amount of material of the indexable insert 16c. This is necessary for turning the indexable insert but is also expedient for transmission of force from the body 15a to the cutting line 51-n. A connecting line between the outermost point and the screw 25 makes a right angle with the first straight line 1e-g.

The Figures show three to five holding or knife jaws. Of course, there is in theory no limit to the number of these jaws but, for example, an arrangement having only two jaws is disadvantageous in that an article to be cut is not guided on a plurality of sides and can therefore leave the two jaws laterally. Arrangements having more than six jaws are in practice certainly somewhat more complicated to produce and can be produced, for example, only by a punching process. However, if it were impossible to guarantee extremely high precision, the entire arrangement might easily jam and no longer function.

Figure 8:
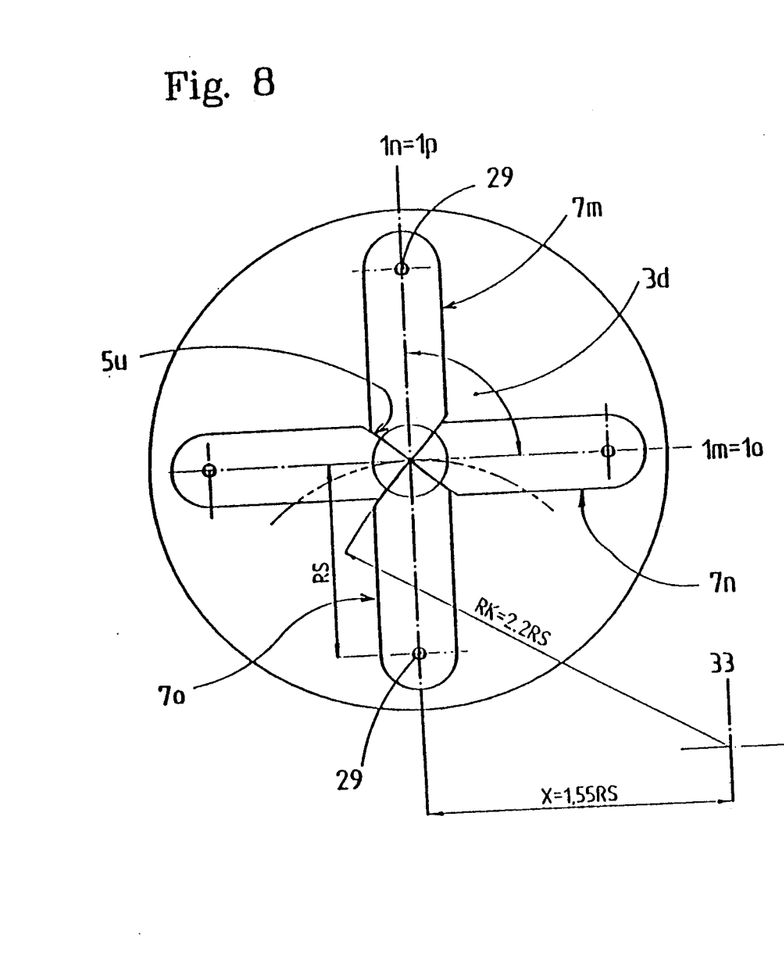
FIG. 8 shows an arrangement having pivotable cutting jaws in the closed state.
Figure 9:
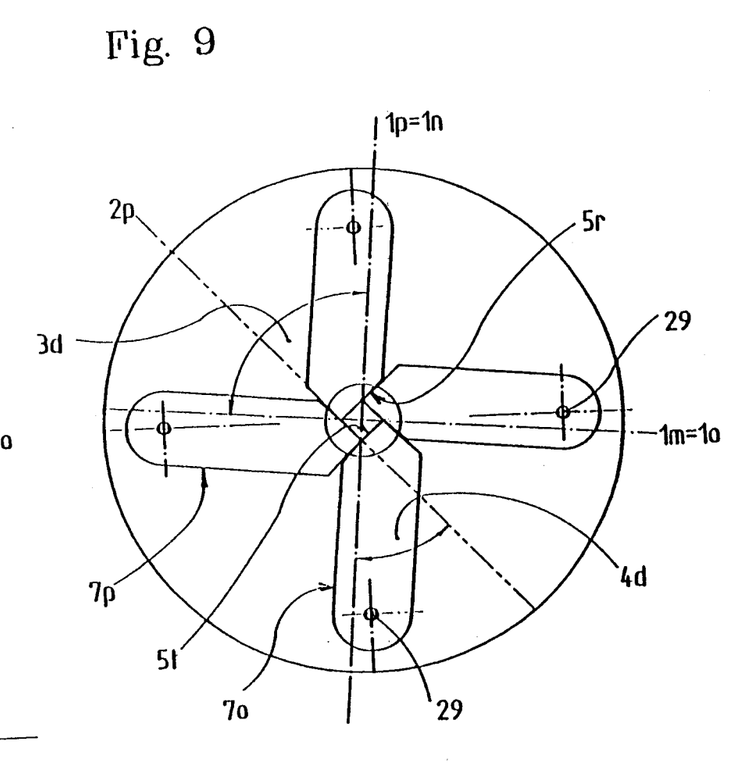
FIG. 9 shows the same arrangement open.

The system of knife jaws 7m-p according to FIG. 8 and 9 differs in principle from the previously described embodiments. The guidance of the knife jaws 7m-p differs. The jaws 7m-p are each pivotable about an axis 29. The guide or cutting lines 5r-u have a convex curvature of radius RK, the radius of this curvature being obtained from 2.2 times the value of the outermost swivel radius RS of the individual knife jaws 7m-p, which in turn is defined by the distance between the individual axes 29 and that point of the associated contact or cutting line 5r-u which is furthest away from the relevant axis. The middle point of the radius of curvature RK is located on a dash-dot line 33, which is located at a distance of 1.55×RS from the associated axis 29. This type of cutting jaw 7m-p can be produced at less expense than the displaceable jaws (for example, track guides or the like are dispensed with); however, control, for example in the case of rotating jaws, entails somewhat greater expense.

Figure 11:
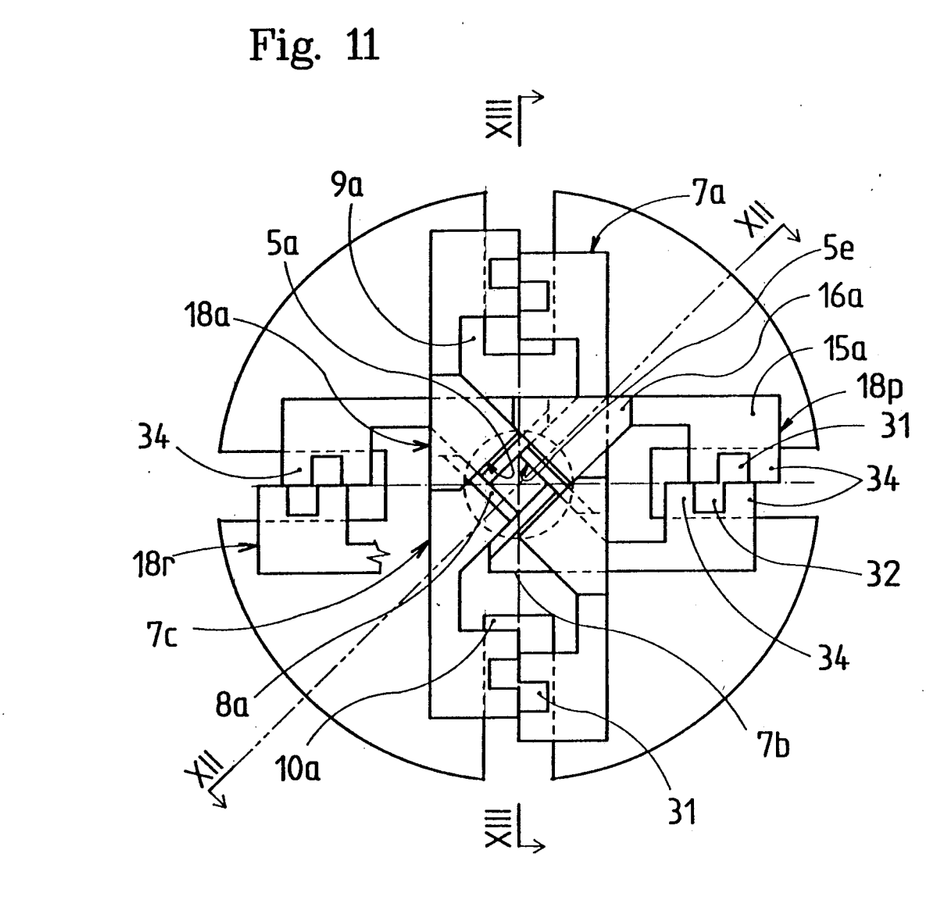
FIG. 11 shows knife and holding jaws mounted one behind the other, in the open state, partially cut away and concealed.

FIG. 11 shows the assembly of an arrangement having knife jaws 7e-h and of holding jaws 18o-r. This Figure does not show the control in detail, but the guide pins are formed on two-armed levers 31, 32 and each engage between two extensions 34 of the knife or holding jaw (cf. FIG. 13).

Figure 12:
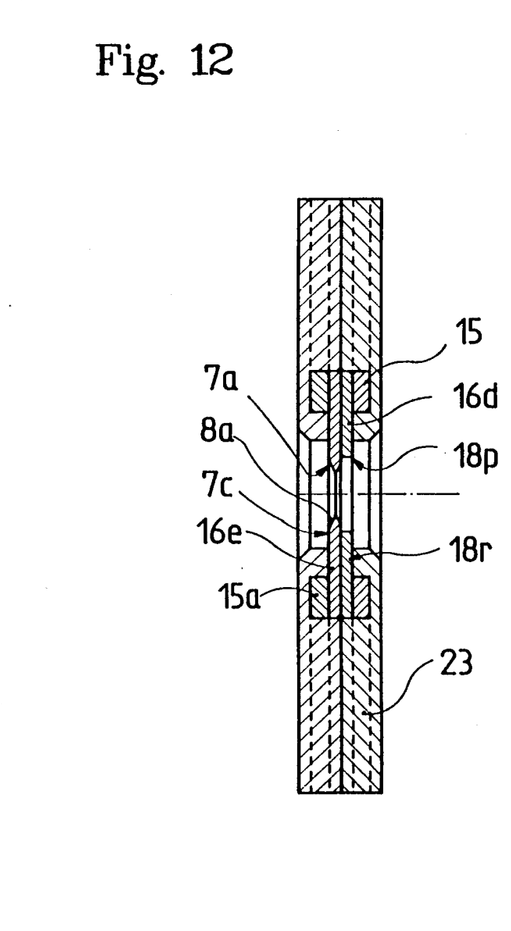
FIG. 12 shows a cross-section along the line XII—XII from FIG. 11.

The holding jaws 18a-d hold or center an article in the field of operation. The knife jaws 7e-h cut the article in the position according to FIG. 11 to a pronounced extent. FIG. 12 shows this situation in section, along the line XII—XII. The blades 5e-h of the knife jaws 7a-d are exactly opposite one another, so that, for example during stripping of the article, identical tensile forces occur (cf. FIG. 17). FIG. 18 shows, in comparison, a conventional knife jaw arrangement (70a, b) whose blades are opposite one another at a distance x apart.

Figure 17:
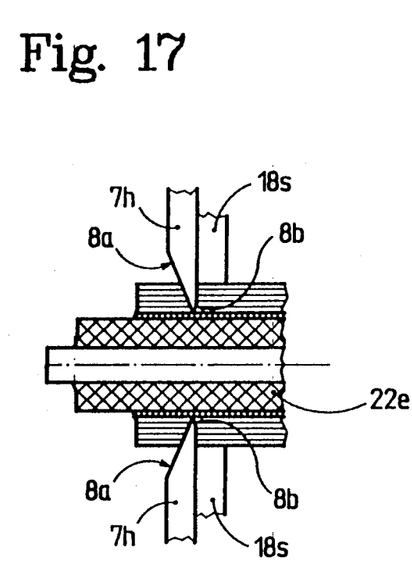
FIG. 17 shows a combination of holding jaws and knife jaws forming a holding and cutting arrangement, in partially concealed and cut away form.
Figure 18:
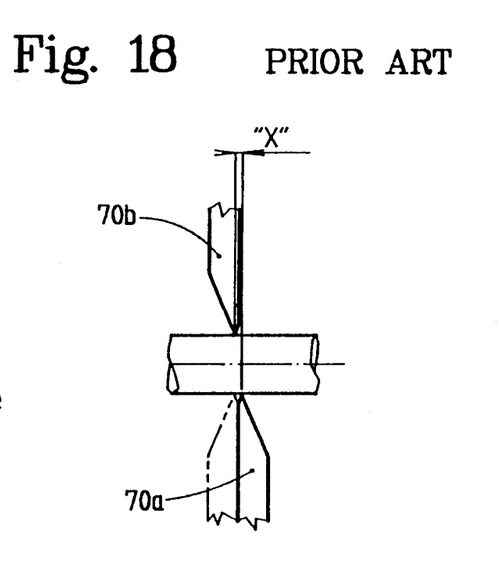
FIG. 18 shows a corresponding part according to the prior art.

In order to describe the support phase 8b according to FIG. 17, it should furthermore be mentioned that an embodiment of this type is advantageous in particular for cutting plates of sintered material, in order to avoid fragmentation of the latter. Thus, it is also very easy, for example, to shield the article 22e with sheet metal without greatly reducing the life of the cutting plates.

Furthermore, FIG. 12 shows the guide plate 23 and the body 15a for the holding jaws 18p and 18r and for the knife jaws 7a and 7c. The blades of the knife jaws 7a-d are provided with a phase 8a.

Figure 13:
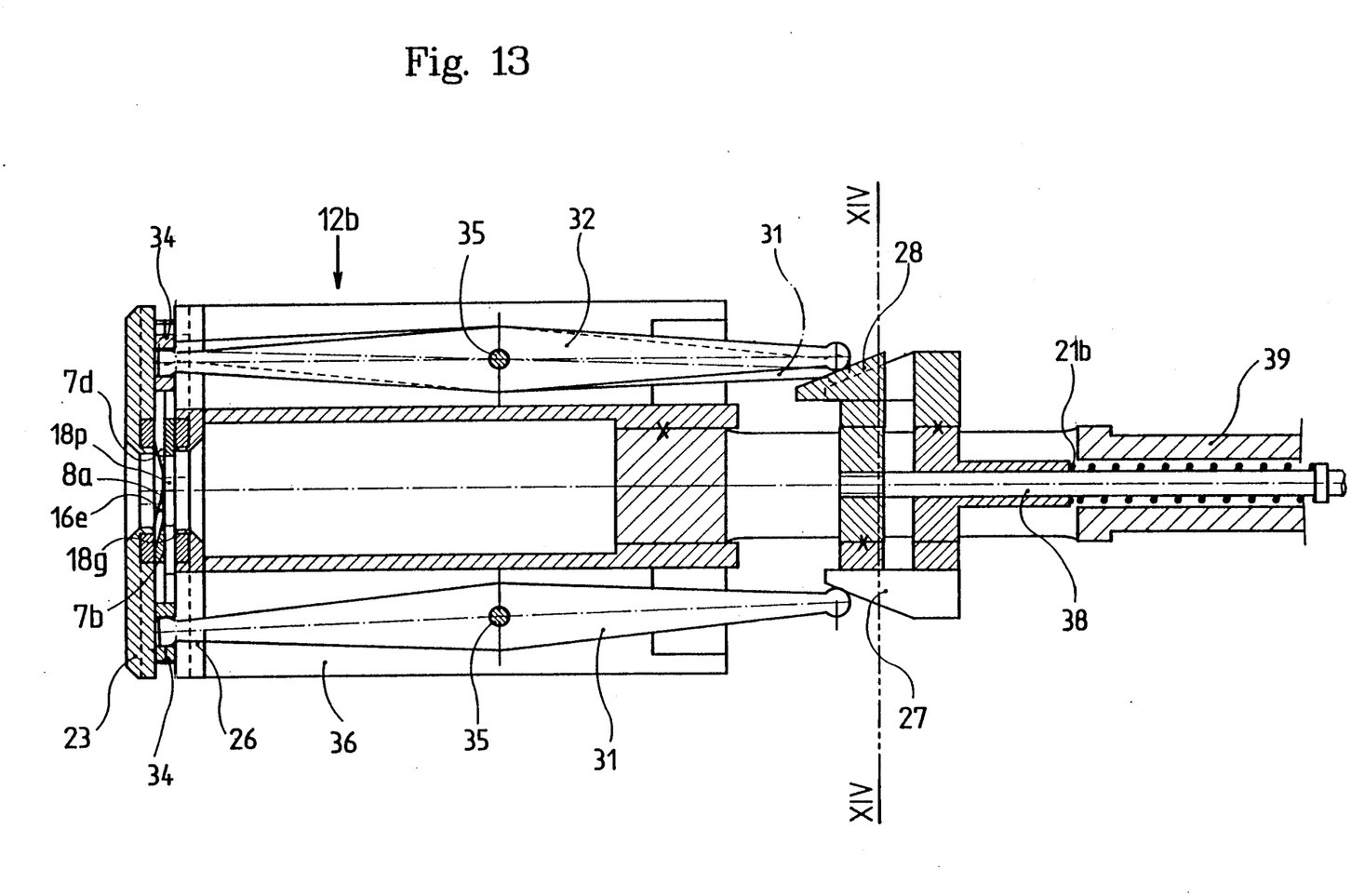
FIG. 13 shows a cross-section along the line XIII—XIII from FIG. 11.

FIG. 13 shows the control means 12b for the arrangement of the jaws in section. The two-armed levers 31 and 32 are each mounted in a holder 36 by means of a pivot axle 35. The levers 31 engage the holding jaws 18u-r, while the levers 32 engage the cutting jaws 7a-d. Control is effected via wedge surfaces 27 and 28 for the levers 31 and 32, respectively, whose displacement is controlled by a slide rod 38. The levers 31 are subjected to the force of a spring 21b. Instead of using a spring 21b, control of the levers 31 could also be effected by means of constraining grooves or joints, so that the levers 31 are under spring-free positive control both in one direction and the other.

The wedge surface 27 together with the associated levers 31 form a self-inhibiting system, so that increased pressure exerted by the holding jaws 18o-r on the levers 31 cannot cause the wedge surfaces 27 to be pushed back against the spring 21b. Hence, an uncontrolled alteration of the predetermined and set distances of the holding jaws 18u-r from one another is not possible. The wedge surfaces 28 are in contact with a slide rod 38 which is guided with the spring 21b in a bush-like holding part 39. For a detailed description of the mechanics of this control means 12b, reference may be made to EP-A-195932.

Figure 14:
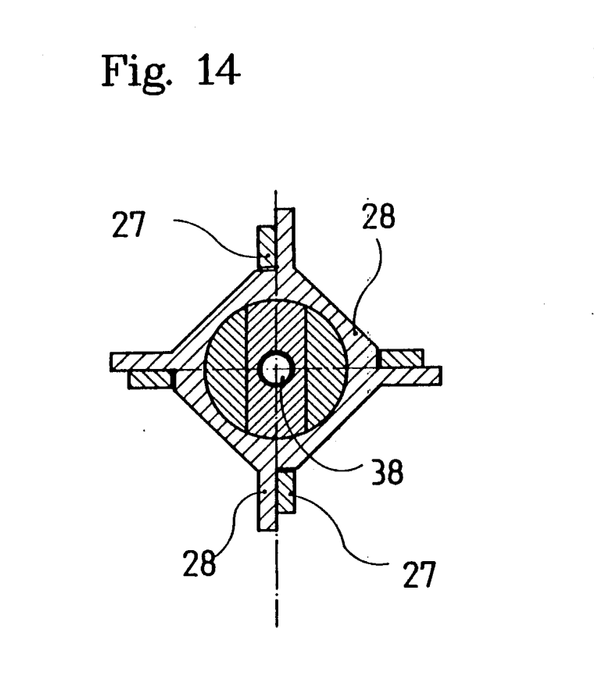
FIG. 14 shows a cross-section through a detail of FIG. 13 along the line XIV—XIV.

Details of the wedge control through section XIV—XIV of FIG. 13 are more clearly evident from FIG. 14.

The invention is not restricted by the Figures shown and the description of these Figures. Instead, it would also be possible, for example, for the angles of inclination of the contact lines to vary and, if necessary, for toothed surfaces to be provided, in particular in the case of holding jaws or centering jaws.

I claim:

1. An arrangement of at least three jaws, lying substantially in a common plane, in an apparatus for cutting or stripping sleeve-like insulation from cable-like articles, wherein the jaws have means permitting each jaw to be displaceable under positive control into engagement with such an article with each jaw engaging the article at a certain respective contact point, said contact point depending on the diameter of the article and being different for each respective diameter of the article.

2. An arrangement of at least three jaws, lying substantially in a common plane, in an apparatus for cutting or stripping sleeve-like insulation from cable-like articles wherein:
   the jaws are each displaceable in the direction defined by a first straight line, the position of the first straight line being defined by the direction of displacement;
   adjacent first straight lines make a first angle with one another;
   the jaws have respective surfaces for engaging the article, and the end points of that surface of the jaw which can be turned to face the article, define a second straight line; and
   each second straight line forms a second angle of less than 90 degrees with its associated first straight line, and the engaging surface can be brought into tangential contact with the article.

3. An arrangement as claimed in claim 2, wherein the first angle is determined by the formula 360:n, where n denotes the number of jaws, while the second angle is determined by the formula 90 minus one-half of the first angle.

4. An arrangement as claimed in claim 3, wherein the second angle is substantially 30 to 60 degrees.

5. An arrangement as claimed in claim 2, wherein each jaw has a recess for receiving an adjacent jaw.

6. An arrangement as claimed in claim 2, wherein the jaws are controlled by a rotating control means having two-armed levers which are actuated by wedge surfaces.

7. An arrangement as claimed in claim 2, wherein each jaw is guided in a track and has at least one guide pin which interacts with a control means.

8. An arrangement as claimed in claim 2, wherein each jaw is a knive jaw having at least one ground chamfer, those chamfers of each knife jaw which face in the same direction being similar.

9. An arrangement as claimed in claim 1, wherein said jaws are knife jaws, and the contact line along which the knife jaws engage the article curves inward and outward, the radius of curvature (RK) being determined by the formula $RK = 2.2 \times RS$, in which RS represents the outermost swivel radius.

10. An arrangement as claimed in claim 2, further comprising at least a second group of at least three jaws each of which lie substantially in a common plane and are parallel to the first-mentioned jaws.

11. An arrangement of at least three jaws, lying substantially in a common plane, in an apparatus for cutting or stripping sleeve-like insulation from cable-like articles; wherein
    the jaws are each pivotable about a pivot point in the direction defined by a first straight line, the first straight line being defined by a tangent to an outermost swivel radius (RS) of each jaw, which outermost swivel radius (RS) is determined by the distance from the pivot point to the most distant point on the corresponding jaw;
    adjacent first straight lines make a first angle with one another;
    the jaws have respective surfaces for engaging the article, and the end points of that surface of the jaw which can be turned to face the aerticle, define a second straight line; and
    each second straight line forms a second angle of less than 90 degrees with its associated first straight line, and the engaging surface can be brought into tangential contact with the article.

12. An arrangement as claimed in claim 4, wherein the second angle is substantially 45 degrees.

13. An arrangment as claimed in claim 7, wherein said control means has a disk with a spiral control groove for engaging and displacing the guide pin and thereby the jaw.

14. An arrangment as claimed in claim 8, wherein each said knife jaw has two said chamfers, at least one of said two chamfers being in the form of a support chamfer.

15. An arrangement as claimed in claim 10, wherein said second group of jaws are displaceable in the axial direction of the article.

* * * * *